L. E. KLUG.
PROCESS OF MANUFACTURE OF RUBBER JARS.
APPLICATION FILED OCT. 24, 1921.
1,406,160.
Patented Feb. 7, 1922.
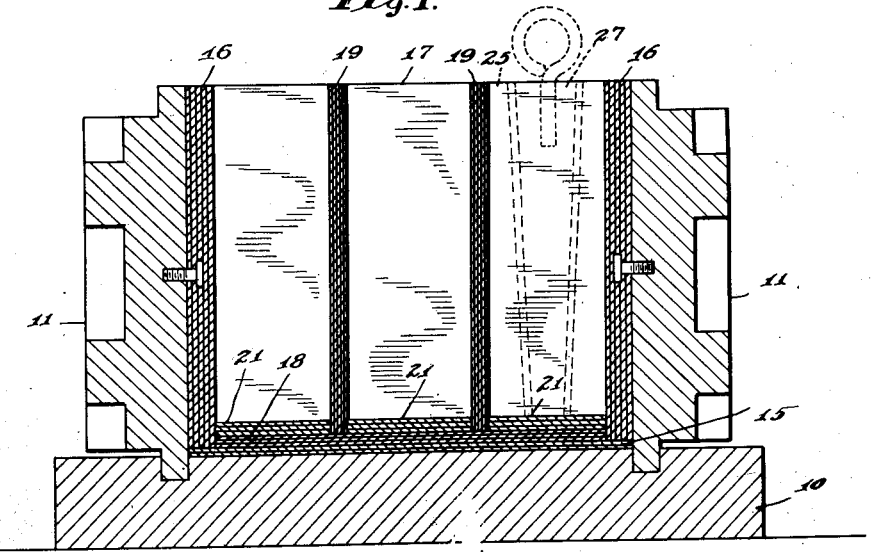
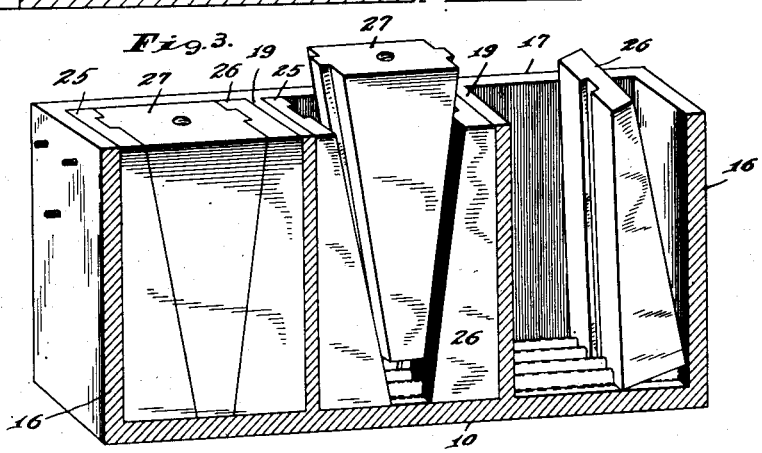
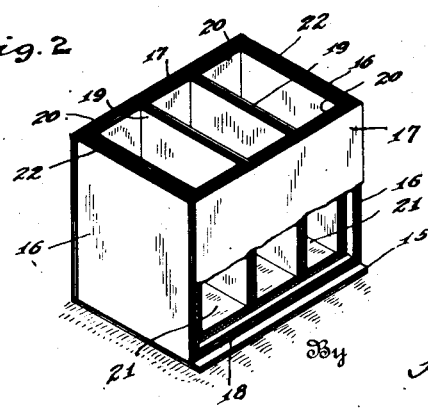
Inventor
Louis E. Klug
By Hood & Schley
Attorneys

UNITED STATES PATENT OFFICE.

LOUIS E. KLUG, OF INDIANAPOLIS, INDIANA, ASSIGNOR TO RUB-TEX PRODUCTS, INC., OF INDIANAPOLIS, INDIANA, A CORPORATION OF INDIANA.

PROCESS OF MANUFACTURE OF RUBBER JARS.

1,406,160.            Specification of Letters Patent.     Patented Feb. 7, 1922.

Application filed October 24, 1921. Serial No. 509,828.

*To all whom it may concern:*

Be it known that I, LOUIS E. KLUG, a citizen of the United States, residing at Indianapolis, in the county of Marion and State of Indiana, have invented a new and useful Process of Manufacture of Rubber Jars, of which the following is a specification.

It is the object of my invention to produce a liquid-tight container, of which at least the inner faces are formed of rubber or rubber composition, and which may have one or more intermediate partitions to form a plurality of cells, as for a battery; and to make the walls and partitions of such container substantially free from danger of leakage, as well as to form them integral with the remainder of the container without danger that they will be torn loose in manufacture.

My present invention is an improvement and development of that shown in my prior Patent No. 1,394,558, granted October 25, 1921.

In carrying out my invention, I proceed as stated in my aforesaid patent; but in addition I make the rubber or rubber-and-fiber sheets which are used in building up the bottom, walls, and partitions of the container of multi-ply or laminated material the plies or laminæ of which are pressed together on the calender so that each sheet is itself laminated. By this construction, I greatly lessen the possibility of leakage, because if there are pin holes or blow holes or other defects in any one ply or lamina the chances for such holes or defects to register in all the plies of all the sheets used in a wall or partition is so remote as to be substantially negligible.

The accompanying drawing illustrates my invention. Fig. 1 is a vertical section through a mold with the initial multi-ply sheets of rubber-composition material in place therein to form the base, walls, and partitions of the battery jar or other container, one of the three-part cores used being indicated in the righthand cell; Fig. 2 is a perspective view, in partial section, of the assembled composition-sides for a plural-cell jar, without showing the mold, and with part of one wall broken away; and Fig. 3 is a perspective section through a completed plural-cell battery jar made in accordance with my invention, taken just inside one of the side walls, and showing the core parts in different positions for the different cells, but with the sheets and their plies all coalesced to make the base, walls, and partitions an integral whole.

It is unnecessary to describe here in detail the features which are set forth in my aforesaid patent, to which reference is made for an understanding of any features shown therein.

The battery jar or other container—a plural-cell battery jar being shown—is made in an outer mold having a base 10 and removable side and end walls 11. The battery jar is built up in the assembled outer mold, as of sheets of the desired rubber or rubber-and-fiber composition which are separately cut to the proper size and arranged to produce step joints where they meet, as fully set forth in my aforesaid patent. There is the bottom sheet 15 which is laid on the base 10, fitting within the side and end walls of the mold. On the bottom sheet 15 are stood the outer end sheets 16 and the outer side sheets 17, which preferably overlap where they meet. The side and end sheets lie against the side and end walls of the mold. A second bottom sheet 18 fitting within the side and end sheets is laid on the bottom sheet 15, thus providing a step joint around the lower corners; though if desired this sheet 18 may be omitted. The partitions 19, if partitions are provided, are set in proper position on the bottom sheet or sheets, with their side edges bearing against the inner faces of the outer side sheets 17. The inner side sheets 20, each as wide as the distance between adjacent partitions or between a partition and the adjacent end wall 16, are put in place to lie against the inner faces of the outer side sheets, thus forming step joints. If desired, supplemental bottom sheets 21 are then put in place horizontally upon the previously named bottom sheet or sheets, fitting the cells formed by the side walls and partitions. There may also be inner end sheets 22, if desired, as shown in Fig. 2. Then a three-part core, with a central keystone portion, is placed in each cell, and the central keystone parts are all driven home to compress the sheets of material between such cores and the outer mold. When the sheets have thus all been assembled and compressed, the whole is vulcanized. All this is exactly as set forth in my prior patent. The various innermost sheets 20, 21, and 22, and the partitions 19, may be of pure rubber or of a better grade of rubber than the other sheets, if desired, to provide an internal veneer, and, if desired, all the sheets except such innermost sheets may be of something else than rubber.

According to my present invention, all the rubber or rubber-and-fiber sheets used are made of a plurality of plies or laminæ which are pressed together on the calender before the sheets are cut. Thus each sheet is itself laminated, or multi-ply, as is indicated in Figs. 1 and 2. By this laminated or multi-ply construction, especially when used in connection with the building up of the bottom and walls of several sheets, leakage is almost surely prevented, for if any pin holes or blow holes or other defects exist in one or more of the individual plies or laminæ, as frequently occurs, such defects will substantially never register in all plies of the sheet; and, in addition, if there are defects in some of the plies of one sheet of the bottom or a wall, there will almost certainly never be defects at the same point in an adjacent sheet. Thus the chance for the registration of defects is prevented both by the use of a plurality of sheets and by the making of the individual sheets of a plurality of plies or laminæ.

When the assembled jar is vulcanized, all the laminæ of the individual sheets, and all the sheets, themselves in their entirety coalesce to form one integral whole, as is indicated in Fig. 3. When the vulcanization is completed, the middle keystone parts 27 of the cores are removed, which relieves the pressure and permits the outer parts 25 and 26 of such three-part cores to be removed easily, as is clear from Fig. 3. Then the outer mold is disassembled, and the battery jar is taken out complete.

I claim as my invention:

1. The process of making a partitioned jar, which consists in building up the bottom and walls of the jar of sheets of suitable rubber material, which sheets have previously been built up of a plurality of plies pressed together in a calender so that each sheet is itself laminated, putting one or more partitions of similar sheet rubber material in place in such jar, and subjecting the material to heat and pressure to produce coalescing of the partitions, walls, and bottom where they meet.

2. The process of making a jar, which consists in building up the bottom and walls of the jar of sheets of suitable rubber material, which sheets have previously been built up of a plurality of plies pressed together in a calender so that each sheet is itself laminated, and subjecting the material to heat and pressure to produce coalescing of the walls and bottom where they meet.

3. The process of making a partitioned jar, which consists in building up the bottom and walls of the jar of sheets of suitable rubber material, which sheets have previously been built up of a plurality of plies pressed together in a calender so that each sheet is itself laminated, putting one or more partitions of similar sheet rubber material in place in such jar with edges of said partitions setting in grooves in adjacent parts, and subjecting the material to heat and pressure to produce coalescing of the partitions, walls, and bottom where they meet.

4. The process of making a partitioned jar, which consists in building up the bottom and walls of the jar of sheets of suitable rubber material, which sheets have previously been built up of a plurality of plies pressed together in a calender so that each sheet is itself laminated, forming step joints at the corners where the bottom and walls meet, putting one or more partitions of similar sheet rubber material in place in such jar, and subjecting the material to heat and pressure to produce coalescing of the partitions, walls, and bottom where they meet.

5. The process of making a jar, which consists in building up the bottom and walls of the jar of sheets of suitable rubber material, which sheets have previously been built up of a plurality of plies pressed together in a calender so that each sheet is itself laminated, forming step joints at the corners where the bottom and walls meet, and subjecting the material to heat and pressure to produce coalescing of the walls and bottom where they meet.

6. The process of making a jar, which consists in building up the bottom and walls of the jar of sheets of suitable rubber material, which sheets have previously been built up of a plurality of plies pressed together in a calender so that each sheet is itself laminated, and using a plurality of such sheets for each wall and for the bottom, and subjecting the material to heat and pressure to produce coalescing of the walls and bottom where they meet.

7. The process of making a partitioned jar, which consists in building up the bottom and walls of the jar of sheets of suitable rubber material, which sheets have previously been built up of a plurality of plies pressed together in a calender so that each sheet is itself laminated, and using a plurality of such sheets to form each outer wall and to form the bottom, putting one or more partitions of similar sheet rubber material in place in such jar, and subjecting the material to heat and pressure to produce coalescing of the partitions, walls, and bottom where they meet.

8. A vulcanized rubber composition jar having one or more of its bottom and walls each formed of one or more laminated sheets of suitable rubber material of which each sheet comprises a plurality of plies which have been pressed together in a calender so that defects which may exist in any individual ply or lamina will not extend through the wall.

In witness whereof, I have hereunto set my hand at Indianapolis, Indiana, this 21st day of October, A. D. one thousand nine hundred and twenty one.

LOUIS E. KLUG.